United States Patent
Lawyer et al.

(10) Patent No.: US 9,459,631 B2
(45) Date of Patent: Oct. 4, 2016

(54) PRESSURE REGULATOR SEAT ASSEMBLY

(75) Inventors: Jerry D. Lawyer, Clermont, FL (US);
Fabian Amaya, Clermont, FL (US)

(73) Assignee: SENNINGER IRRIGATION, INC., Clermont, FL (US)

( * ) Notice: Subject to any disclaimer, the term of this patent is extended or adjusted under 35 U.S.C. 154(b) by 1095 days.

(21) Appl. No.: 13/105,178

(22) Filed: May 11, 2011

(65) Prior Publication Data
US 2012/0285561 A1 Nov. 15, 2012

(51) Int. Cl.
*G05D 16/08* (2006.01)
*G05D 16/06* (2006.01)

(52) U.S. Cl.
CPC ...... *G05D 16/0608* (2013.01); *Y10T 137/8593* (2015.04)

(58) Field of Classification Search
USPC ............................................ 137/505.25, 508
See application file for complete search history.

(56) References Cited

U.S. PATENT DOCUMENTS

| 4,543,985 | A | 10/1985 | Healy et al. |
| 5,875,815 | A | 3/1999 | Ungerecht et al. |
| 5,881,757 | A | 3/1999 | Kuster et al. |
| 6,758,238 | B2 | 7/2004 | Callies |
| 7,048,001 | B2 * | 5/2006 | Youngberg et al. ..... 137/505.25 |
| 7,140,595 | B2 | 11/2006 | Youngberg et al. |

* cited by examiner

*Primary Examiner* — John K Fristoe, Jr.
(74) *Attorney, Agent, or Firm* — Knobbe, Martens, Olson & Bear, LLP

(57) ABSTRACT

A pressure regulator seat assembly is disclosed. In a particular embodiment, the assembly includes a chamber, a tapered flange projecting from an upstream edge of the chamber into a flow path of the assembly, where a proximate end of the flange attached to the chamber is tapered continuously to its distal end into the flow path. In addition, the assembly includes a throttling stem seat disposed on a lower surface of the flange and a plurality of support ribs adapted to support the flange, where the plurality of ribs is spaced about one half side of the chamber. The assembly may also include a complementary base adapted to mount to the chamber about a downstream edge of the chamber to form the assembly.

16 Claims, 5 Drawing Sheets

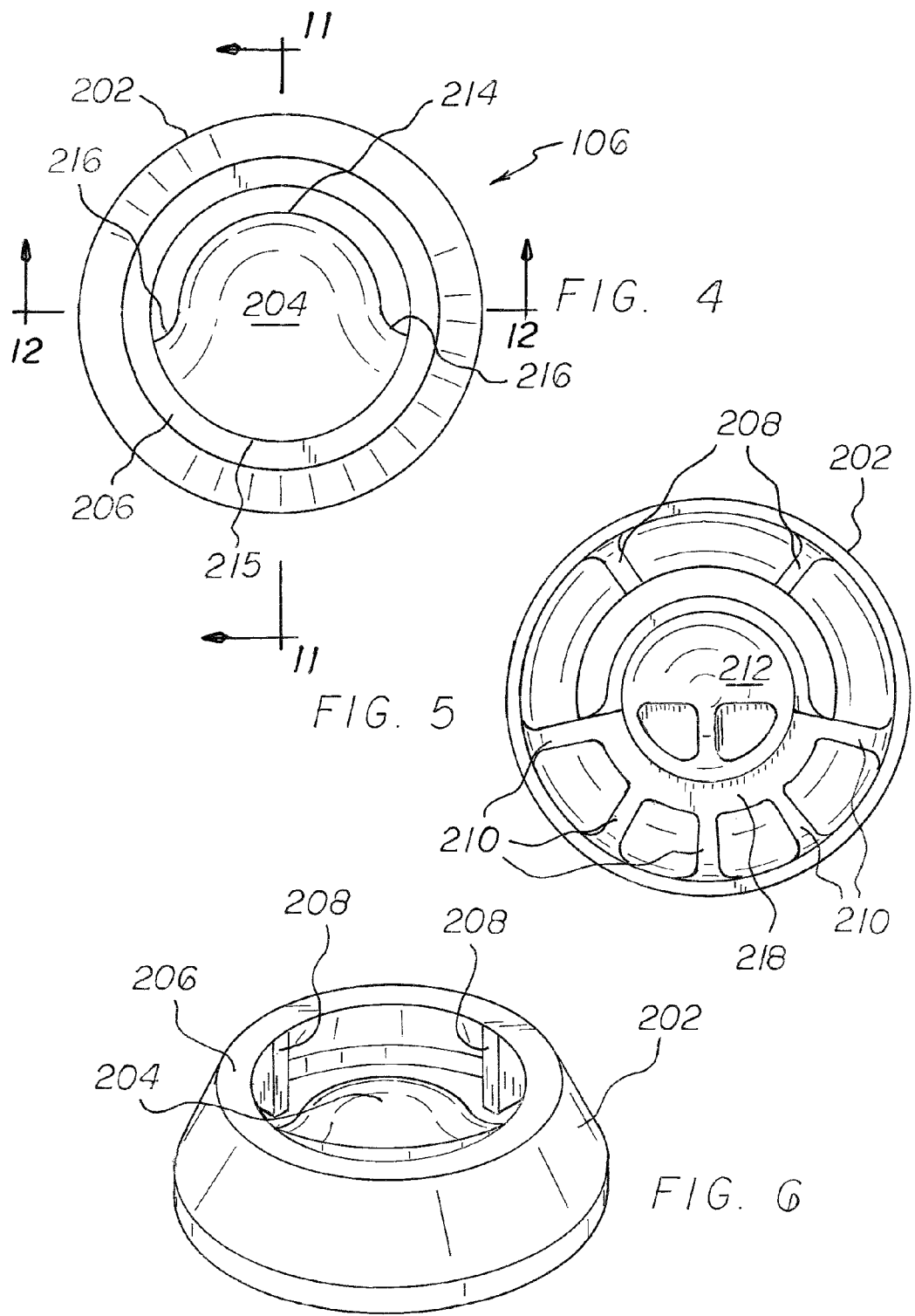

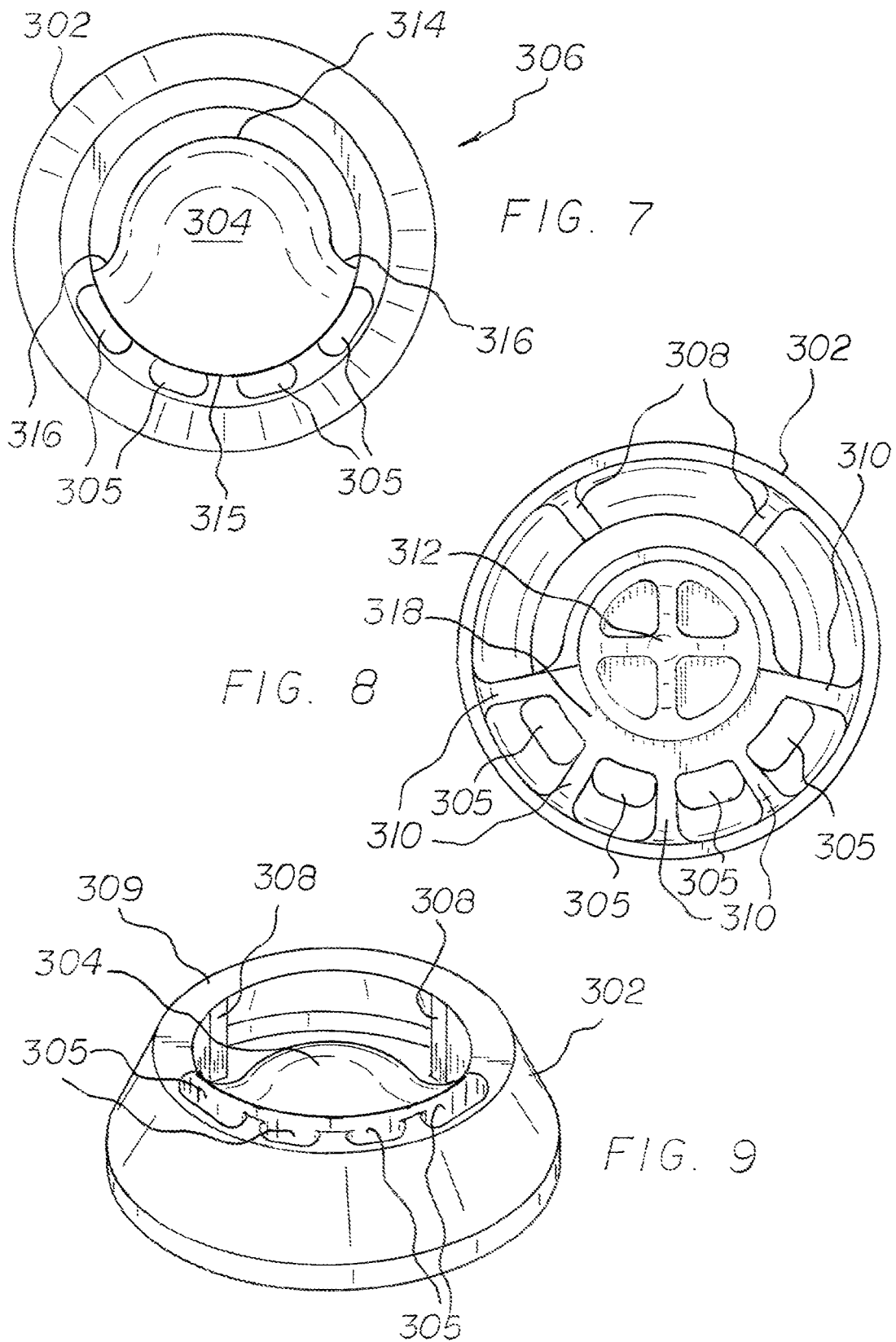

FIG. 10
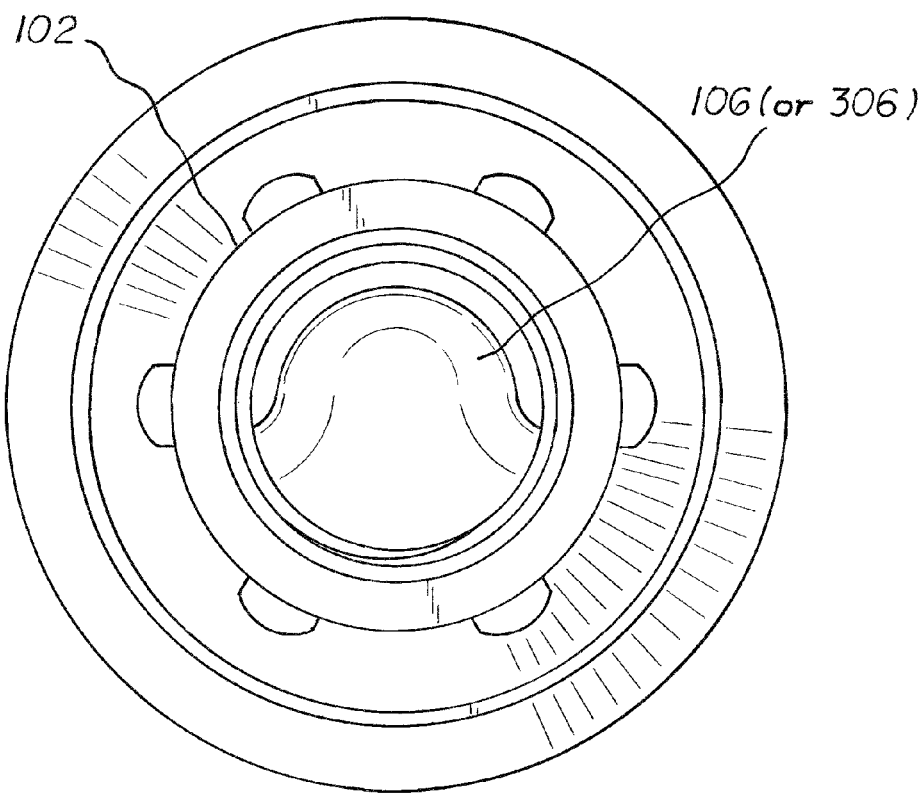
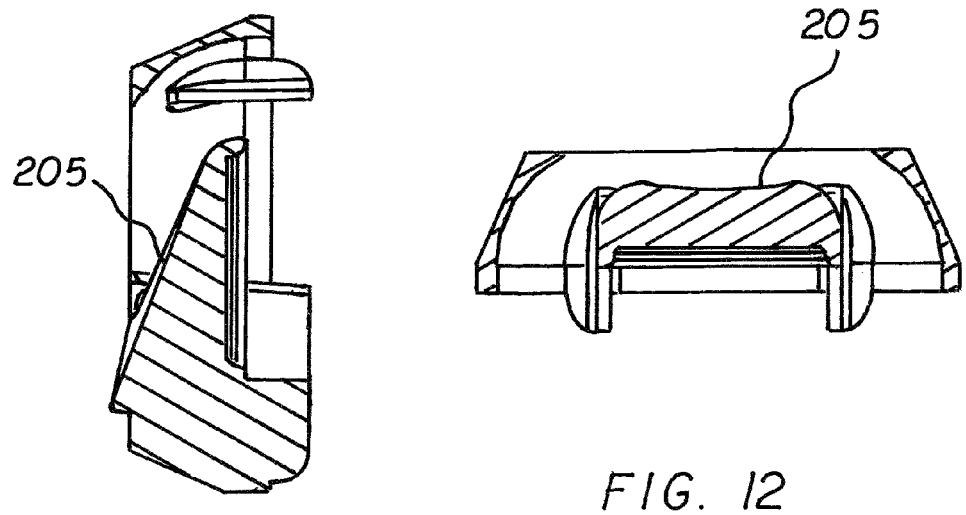
FIG. 11
FIG. 12

_US 9,459,631 B2_

PRESSURE REGULATOR SEAT ASSEMBLY

I. FIELD

The present invention relates in general to pressure regulators and in particular to a pressure regulator seat assembly.

II. DESCRIPTION OF RELATED ART

In sprinkler irrigation systems, water is received from a source of water under pressure and is introduced into a main water supply pipe which is connected with one or more distributing pipes forming a fluid conduit. The irrigation system includes a plurality of discharge irrigation sprinkler heads. Water pressure throughout the pipe lines tends to vary for a variety of reasons and, as the pressure varies between two sprinklers having discharge orifices of exactly the same size, so does the output flow. The quantity of water discharged over any given period of time varies in relation to the variations in pressure, thus causing uneven distribution of water from a sprinkler system with a greater amount of water being discharged through sprinklers where the pressure is higher and a lesser amount through sprinklers where the pressure is lower. To counter this problem, pressure regulators have been developed which can be attached to the water line ahead of the sprinkler head to maintain constant pressure at the sprinkler head for all the sprinkler heads in the irrigation system.

There have been a great variety of fluid pressure regulators for regulating the flow of fluids through a pipe in irrigation systems. These pressure regulators typically rely on a spring biasing a piston or other member in a passageway for opening or closing a portion of the passageway. Passageways typically go around the seat and follow a circuitous passage. One prior art pressure regulator may be seen in Applicant's prior U.S. Pat. Nos. 4,543,985 and 5,881,757, which disclose a pressure regulator having a housing with a passageway therethrough and having a spring biased throttling stem. The throttling stem is mounted in the housing passageway for adjusting the opening through the pressure regulator seat assembly so that fluid pressure is adjusted between the input and output of the fluid pressure regulator. The throttling stem also has a dampening member or pressure controller to dampen oscillations in the throttling stem. A housing holds the pressure regulator's internal mechanism in place with or without the use of screws, other threaded fasteners or any other means of joining the housing for locking the components together.

U.S. Pat. Nos. 7,048,001 and 7,140,595 to Youngberg, et al., describe a pressure regulator with a single strut regulator seat in an attempt to reduce the amount of hairpinning of fibrous debris. However, a shortcoming of Youngberg is that the single strut connects to the seat using a neck or pinched portion between an annular support ring and a throttling stem seat that is highly susceptible to hairpinning of fibrous material and trash. The fibrous material caught in the pressure regulator adversely affects the hydraulic performance. None of the prior art pressure regulators have the ability to eliminate the hairpinning of fibrous materials around the throttling seat assembly. Accordingly, what is needed in the art is a pressure regulator seat assembly that is able to pass fibrous materials and trash and eliminates hairpinning around the throttling seat assembly.

However, in view of the prior art at the time the present invention was made, it was not obvious to those of ordinary skill in the pertinent art how the identified needs could be fulfilled.

III. SUMMARY

In a particular embodiment, a pressure regulator seat assembly is disclosed. The assembly includes a chamber, a tapered flange projecting from an upstream edge of the chamber into a flow path of the assembly, where a proximate end of the flange attached to the chamber is tapered continuously to its distal end into the flow path. In addition, the assembly includes a throttling stem seat disposed on a lower surface of the flange and a plurality of support ribs adapted to support the flange, where the ribs are spaced about one half side of the chamber. The assembly may also include a complementary base adapted to mount to the chamber about a downstream edge of the chamber.

In another particular embodiment, the assembly includes a chamber, a flange projecting from an upstream side of the chamber into the flow path of the assembly, where a proximate end of the flange attached to the chamber is tapered to its distal end, and a throttling stem seat disposed on a downstream side of the tapered flange. A plurality of ribs may support the flange and an open space is interposed between each rib.

In another particular embodiment, the assembly includes a chamber, a plurality of ribs projecting from a sidewall of the chamber towards a center of the assembly, where the ribs are spaced about one half side of the chamber, and a throttling stem seat supported about its periphery by the plurality of ribs. In addition, the assembly may include a flange covering an upstream portion of the plurality of ribs and the throttling stem seat. A base may be used to secure and seal a downstream portion of the assembly to a pressure regulator housing. The flange may be continuously tapered from its proximate end towards the throttling stem seat. Also, an upstream surface of the flange may have a flat, concave, or convex configuration.

One particular advantage provided by embodiments of the pressure regulator seat assembly is that hairpinning of fibrous materials is eliminated.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 4 is a top view of a particular embodiment of a pressure regulator seat assembly;

FIG. 5 is a bottom view of a particular embodiment of the pressure regulator seat assembly of FIG. 4;

FIG. 6 is a perspective top view of a particular embodiment of the pressure regulator seat assembly of FIGS. 4-5;

FIG. 7 is a top view of a particular embodiment of a pressure regulator seat assembly;

FIG. 8 is a bottom view of a particular embodiment of the pressure regulator seat assembly of FIG. 7;

FIG. 9 is a perspective top view of a particular embodiment of the pressure regulator seat assembly of FIGS. 7-8;

FIG. 10 is an inlet view of the pressure regulator of FIG. 1, with either embodiment of FIG. 6 or FIG. 9;

FIG. 11 is a cross section view taken along line 11-11 shown in FIG. 4; and FIG. 12 is a cross section view taken along line 12-12 shown in FIG. 4.

V. DETAILED DESCRIPTION

Figure 1:
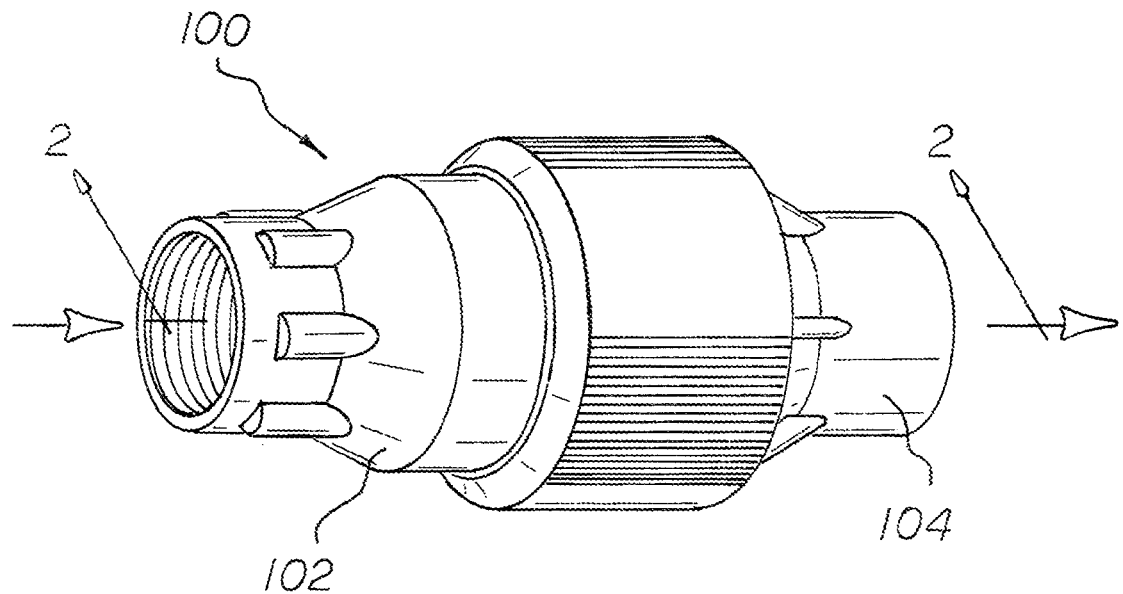
FIG. 1 is a perspective view of a particular embodiment of a pressure regulator.

Referring now to FIG. 1, a pressure regulator is illustrated and generally designated 100. The pressure regulator 100 includes an inlet housing 102 and an outlet housing 104. The pressure regulator 100 may be used for an irrigation sprinkler system such that the outlet housing 104 and inlet housing 102 have internal threads. The internal threading allows the pressure regulator 100 to be threadedly attached into the water line of the irrigation system to regulate the pressure of the water passing therethrough.

Figure 2:
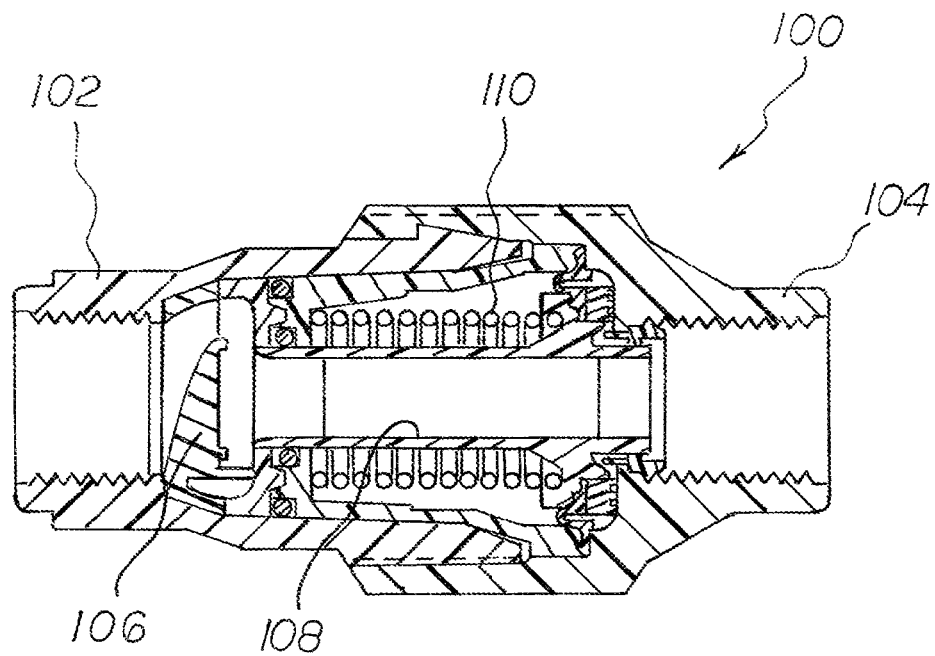
FIG. 2 is a sectional view of the pressure regulator of FIG. 1.
Figure 3:
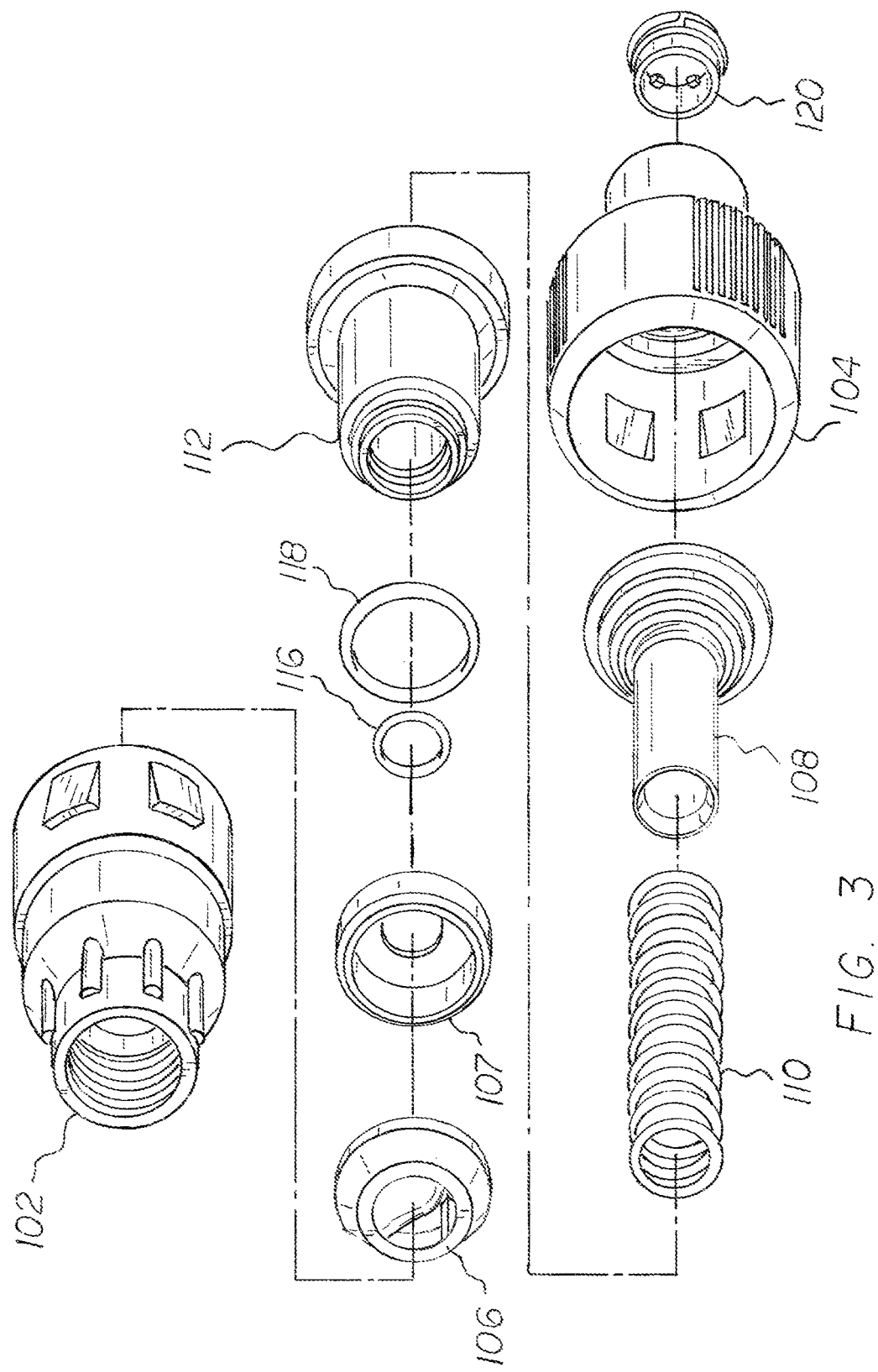
FIG. 3 is an exploded view of the perspective view of the pressure regulator of FIG. 1.

The pressure regulator 100 includes a pressure regulator mechanism, as seen in FIG. 2 and FIG. 3. The pressure regulator inlet housing 102 has a generally cylindrical connecting portion having a plurality of wedges formed on its exterior. The pressure regulator outlet housing 104, as seen in FIG. 3, has a gripping surface formed on the exterior side thereof. The gripping surface is in the form of a plurality of ridges and grooves for gripping the outlet housing 104 for rotating or holding for threading a water connection line to the pressure regulator 100. The outlet housing 104 includes a plurality of internal niches which are each formed having an internal wedge shape and each positioned to align with one of the wedges on the inlet housing 102. The generally cylindrical surface of the inlet housing 102 is sized to fit into the interior cylindrical wall of the outlet housing 104 with a close tolerance which thereby leaves the wedge portions protruding outside the interior wall outlet housing 104. The housing portions 102 and 104 are made of a substantially rigid material, such as a thermoplastic polymer, so that to attach the inlet housing 102 to the outlet housing 104, requires that the inlet housing 102 be forced into the outlet housing 104 under sufficient force to expand the outlet housing 104 interior walls to drive the wedges into the niches. Since the materials are substantially rigid materials, a larger amount of force is required to drive the housing portions 102, 104 together to cause the expansion of the material but the housing portions 102, 104 are locked together such that they will not later loosen. The housings 102, 104 may be attached with the pressure regulator mechanism positioned thereinside so that the pressure regulator 100 is fully assembled when the housings 102, 104 are driven together. The housings 102, 104 cannot thereby be disassembled in the field and will not loosen with the loosening of screws or the softening of adhesives.

Turning to FIG. 3, the pressure regulator mechanism has a compression spring 110 riding on a throttling stem 108 having a flanged portion for holding one end of the spring 110 thereagainst. The flange portion may also have an annular groove formed therein which rides in the annular pressure dampener. A pressure regulator seat assembly 106 is mounted inside the inlet housing 102 and rests in a complementary base 107. The pressure regulator seat assembly 106 includes a chamber 202 (FIG. 4) having curved interior surfaces that improve the hydraulic efficiency of the pressure regulator. O-ring 116 forms a watertight seal between the throttling stem 108 and the cup 112 while o-ring 118 is used to form a watertight seal between the cup and the regulator housing 102. The exterior of the assembly 106 may have a conical frustum shape with an upstream opening that is smaller in diameter than the downstream opening through the chamber to increase hydraulic efficiency.

The outlet pressure of the water passing through the pressure regulator 100 is adjusted by the axial movement of the throttling stem 108 against which a diaphragm is attached. The diaphragm is also part of the area which has the outlet pressure applied thereagainst to compress the spring 110 and partially close the passage between the throttling stem 108 and the pressure regulator seat assembly 106, until a balance is attained between the inlet water pressure and desired outlet water pressure, as determined by the compressive strength of the spring.

Referring now to FIGS. 4-6, a particular embodiment of the pressure regulator seat assembly 106 is illustrated. A tapered flange 204 projects from an upstream edge of the chamber 202 of the assembly 106 into a flow path of the pressure regulator 100. The flange 204 may include tapered edges 216 that continuously taper from its proximate end 215 towards the throttling stem seat 212 or at least the flange either tapers along its length or maintains its width with no necking or pinching to avoid hairpinning of fibrous material and trash. A throttling stem seat 212 is disposed on a lower surface of the flange 204 and is adapted to receive the throttling stem 108. A plurality of support ribs 210 are adapted to support the flange 204, where the ribs 210 are spaced about approximately one half side of the chamber 202. The plurality of ribs 210 provide approximately 180 degrees of increased structural support around the throttling stem seat 212 to prevent breakage under high pressure or flows. The complementary base 107 is adapted to mount to the chamber 202 about a downstream edge of the chamber 202. The complementary base 107 is adapted to secure and seal a downstream portion of the assembly 106 to the inlet housing 102 of the pressure regulator 100. The chamber 202 may also include a ledge 206 about a periphery of the upstream edge of the chamber 202 to provide an adjacent surface to seal an upstream portion of the assembly 106 to a pressure regulator inlet housing 102.

In a particular embodiment, the upstream surface of the flange 204 may have a relatively flat surface, or have a partial concave or convex configuration, or any combination thereof. Axial components of the chamber 202, such as the flange 204, are disposed in a same direction of the flow to assist in shedding any debris within a fluid flow through the pressure regulator 100. For example, as best shown in FIG. 11, the entire upstream surface 205 of the flange 204 slopes continuously downstream in the same direction as the flow to further assist in shedding any debris within the fluid flow. An annular wall 218 may be disposed about one half of the throttling stem seat 212 projecting downstream and supported by the plurality of ribs 210. At least one internal ridge 208 of the chamber 202 extends beyond the downstream edge of the chamber 202 to assist in positioning the chamber 202 over the base 107.

Another particular embodiment of the pressure regulator seat assembly, which is designated 306, is illustrated in FIGS. 7-9. In this particular embodiment, each rib 310 is separated by an open space 305 therebetween. The flange 304 is projecting from an upstream side of the chamber 302 into the flow path of the assembly 306, where a proximate end 315 of the flange 304 is attached to the chamber 302 and is tapered towards its distal end 314 with no necking or pinching along its length. A throttling stem seat 312 is disposed on a downstream side of the tapered flange 304 and adapted to receive the throttling stem 108 described above. The chamber 302 may include a conical frustum exterior shape having curved interior surfaces to increase hydraulic efficiency of the throttling seat assembly 306 and regulator 100. A complementary base 107 is adapted to secure and seal a downstream portion of the throttling seat assembly 306 to an inlet housing 102 of the pressure regulator 100 for a watertight seal. A ledge 309 is formed around an upstream peripheral edge of the chamber 302. The plurality of ribs 310 project from a sidewall of the chamber 302 towards a center of the throttling seat assembly 306, where the plurality of ribs 310 are spaced about one half side of the chamber 302. The throttling stem seat 312 is supported about its periphery by the plurality of ribs 310. The flange 304 may include tapered edges 316 that continuously taper from its proximate end 315 towards the throttling stem seat 312 or at least the flange either tapers along its length or maintains its width with no necking or pinching to avoid hairpinning of fibrous material and trash.

Referring now to FIG. 10, an inlet view of the pressure regulator 100 illustrates the seat assembly 106 (or 306) installed within the inlet housing 102. Both embodiments of the seat assembly 106 and 306 have a similar appearance from the inlet view when installed within the pressure regulator 100.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A pressure regulator seat assembly, the assembly comprising:
   a chamber;
   a tapered flange continuously sloping downstream from an upstream edge of the chamber into a flow path of the assembly, wherein a proximate end of the flange attached to the chamber is tapered continuously to its distal end into the flow path;
   a throttling stem seat disposed on a lower surface of the flange;
   a plurality of support ribs adapted to support the flange, wherein the plurality of ribs is spaced about one half side of the chamber; and
   a complementary base adapted to mount to the chamber about a downstream edge of the chamber to form the assembly.

2. The assembly of claim 1, wherein the chamber further comprising a ledge about a periphery of the upstream edge of the chamber to provide an adjacent surface to seal an upstream portion of the assembly to a pressure regulator housing.

3. The assembly of claim 1, wherein the base is adapted to secure and seal a downstream portion of the assembly to a pressure regulator housing.

4. The assembly of claim 1, wherein axial components of the chamber surface are disposed in a same direction to assist in shedding any debris within a fluid flow through the assembly.

5. The assembly of claim 1, wherein each rib of the plurality of ribs is separated by an open space therebetween.

6. The assembly of claim 1, further comprising an annular wall about one half of the throttling stem seat projecting downstream and supported by the plurality of ribs.

7. The assembly of claim 1, further comprising an internal ridge of the chamber that extends beyond the downstream edge of the chamber to assist in positioning the chamber over the base.

8. A pressure regulator seat assembly, the assembly comprising:
   a chamber;
   a flange continuously sloping downstream from an upstream side of the chamber into the flow path of the assembly, wherein a proximate end of the flange attached to the chamber is tapered to its distal end; and
   a throttling stem seat disposed on a downstream side of the tapered flange.

9. The assembly of claim 8, wherein an interior of the chamber includes curved interior surfaces to increase hydraulic efficiency.

10. The assembly of claim 8, further comprising a base adapted to secure and seal a downstream portion of the assembly to a pressure regulator housing.

11. The assembly of claim 8, further comprising a plurality of ribs to support the flange.

12. The assembly of claim 8, further comprising a ledge around an upstream peripheral edge of the chamber.

13. A pressure regulator seat assembly, the assembly comprising:
   a chamber;
   a plurality of ribs projecting from a sidewall of the chamber towards a center of the assembly, wherein the plurality of ribs is spaced about one half side of the chamber;
   a flange having an upstream surface continuously sloping downstream and covering an upstream portion of the plurality of ribs; and
   a throttling stem seat supported about its periphery by the plurality of ribs.

14. The assembly of claim 13, further comprising a base adapted to secure and seal a downstream portion of the assembly to a pressure regulator housing.

15. The assembly of claim 14, wherein the flange is continuously tapered from its proximate end towards the throttling stem seat.

16. The assembly of claim 15, wherein an exterior of the assembly having a conical frustum shape.

* * * * *